US007303784B2

(12) United States Patent
Nonninger et al.

(10) Patent No.: US 7,303,784 B2
(45) Date of Patent: Dec. 4, 2007

(54) METHOD FOR PRODUCING SELF-CLEANING CERAMIC LAYERS AND A COMPOSITION THEREFORE

(75) Inventors: Ralph Nonninger, Saarbrücken (DE); Olaf Binkle, Kirkel (DE); Stefan Faber, Saarbrücken (DE); Martin Jost, Heusweiler (DE)

(73) Assignee: ItN Nanovation AG, Saarbrücken (DE)

( * ) Notice: Subject to any disclaimer, the term of this patent is extended or adjusted under 35 U.S.C. 154(b) by 0 days.

(21) Appl. No.: 10/488,809

(22) PCT Filed: Jul. 29, 2002

(86) PCT No.: PCT/DE02/02773

§ 371 (c)(1),
(2), (4) Date: Aug. 13, 2004

(87) PCT Pub. No.: WO03/027348

PCT Pub. Date: Apr. 3, 2003

(65) Prior Publication Data

US 2004/0253432 A1    Dec. 16, 2004

(30) Foreign Application Priority Data

Sep. 6, 2001    (DE)    ................ 101 43 837

(51) Int. Cl.
*B05D 3/02*    (2006.01)
(52) U.S. Cl. .......... 427/379; 427/380; 427/397.7; 427/421.1; 427/427; 427/430.1
(58) Field of Classification Search .......... None
See application file for complete search history.

(56) References Cited

U.S. PATENT DOCUMENTS 4,845,056 A * 7/1989 Yamanis .............. 501/12
5,439,624 A * 8/1995 Anderson et al. ...... 501/80
6,086,948 A   7/2000 Roth et al.
6,953,603 B2* 10/2005 Nonninger et al. ..... 427/226
2003/0003237 A1* 1/2003 Seabaugh et al. ...... 427/421
2005/0126438 A1* 6/2005 Binkle et al. ......... 106/286.8
2006/0051556 A1* 3/2006 Ohno et al. ........... 428/116

FOREIGN PATENT DOCUMENTS

| DE | 39 42 236 A1 | 6/1991 |
| EP | 0940631 | 8/1999 |
| EP | 1 036 826 A1 | 9/2000 |
| JP | 60147478 | 3/1985 |
| JP | 2069574 | 8/1990 |
| JP | 3056144 | 11/1991 |
| WO | WO 96/40430 | * 12/1996 |
| WO | WO 99/50203 | * 10/1999 |

OTHER PUBLICATIONS

Verweij, Adv. Materials, 10(17), pp. 1483-1486, 1998.*
Verweij, Advanced Materials, 10(17), pp. 1483-1486, 1998.*
A. Kalleder, et al., "Nanometer Sized Particles for Viscosity Controlled Binders for Silk Screen Printing", Journal of Non-Crystalline Solids, 218 (1997), pp. 399-402.

* cited by examiner

*Primary Examiner*—Erma Cameron
(74) *Attorney, Agent, or Firm*—Walter A. Hackler

(57) ABSTRACT

The invention concerns a method for producing a highly-porous ceramic layer and for application of this layer onto metallic, ceramic, enameled and/or glass substrates using porous, ceramic particles, preferably aluminum oxide, titanium oxide and zircon oxide, and an inorganic binder system. The inorganic binder system contains at least one ceramic nanoparticle of a particle size of less than 100 nm, preferably less than 50 nm and particularly preferred less than 25 nm, the solvent being water. Layers produced in this fashion are suited as self-cleaning catalytically active layers e.g. in ovens, in combustion engines etc. or for general coating of substances to considerably increase their specific surface e.g. for catalytic substrates.

13 Claims, No Drawings

METHOD FOR PRODUCING SELF-CLEANING CERAMIC LAYERS AND A COMPOSITION THEREFORE

BACKGROUND OF THE INVENTION

The invention concerns a method for producing a highly-porous, ceramic layer which can be applied to metallic, ceramic, enameled and/or glass substrates using porous, ceramic particles, preferably aluminum oxide, titanium oxide and zirconium oxide and an inorganic binder system. The inorganic binder system contains at least one ceramic nanoparticle of a particle size of less than 100 nm, preferably less than 50 nm and particularly preferred less than 25 nm, the solvent being water. Layers produced in this fashion are suited for self-cleaning catalytically active layers e.g. in ovens, in combustion engines etc. or for general coating of substrates, to considerably increase their specific surface area e.g. for catalytic applications.

Ovens contain a cooking chamber which is lockable by a door and is delimited by an oven muffle. During roasting and baking, the side walls of the cooking chamber are soiled e.g. by splashing fat or meat juice or the like. This soiling during baking and roasting cannot be prevented. For this reason, the manufacturers have proposed several ways to clean the walls, top and bottom, i.e. the inner space of the cooking chamber. One generally differentiates between catalytic and pyrolytic cleaning.

For pyrolytic cleaning, the cooking chamber has so-called grill rods which can be controlled and heated through a separate, electronically controlled program and are preferably mounted to the top of the cooking chamber. The organic soiling is carbonized, i.e. completely burnt, at temperatures of more than 500° C. (Cepem Cie Euro Equip Menager [FR2605391] or Bosch Siemens Haushaltsgeräte GmbH [DE2526096]. Pyrolytic cleaning is demanding and expensive due to the required high temperatures. Ovens with pyrolytic cleaning must have suitable protective mechanism to block the door of the cooking chamber during pyrolysis (from approximately 320° C., Bosch Siemens Hausgeräte GmbH [EP 0940631] to protect the oven from improper operation. Since these ovens furthermore require more expensive heating elements to be able to control the high temperature at all, pyrolysis systems have been established only in ovens of the top price bracket.

In view of the costs, the catalyst systems are preferable to pyrolysis systems since catalytic combustion of soiling takes place at lower temperatures, i.e. below 500° C. Matsushita Elec. Ind. Co. Ltd. [JP03056144] proposes lining of the interior of the oven with a catalytically active coating which consists of a binder system and a catalytically active powder. Metal oxides are used as catalyst, preferably manganese dioxide and silicon resins are used as binders. This catalytic coating permits cleaning of the oven interior already between 380° C. and 400° C. as stated by the manufacturer. Mixture of a catalyst and a binder system or a layer matrix for coating the inner surface of an oven can also be found with other oven manufacturers. Toshiba [JP60147478] uses manganese oxide or ferrite as catalyst and sodium silicate as binder phase. In an analog fashion, Sharp KK [JP54135076] uses quartz sand or sodium silicate as binder phase and iron oxide or copper oxide as catalyst. These protective rights give no statement about the effectivity of the two latter catalytic coatings. The onset temperature of the coating, i.e. the temperature at which the layer starts to work, was reduced in accordance with the above-mentioned documents to 270° C. to 300° C. (Toshiba) and even to 250° C. (Sharp KK). In practice this means, that there are catalytic coatings which start to break down fat etc. in the interior of the oven at temperatures below 320° C., however, the efficiency of the coating is not sufficient to completely finish this decomposition. After each baking or roasting cycle, residues of non-decomposed fat remain in or on the layer lining the interior of the oven, such that after a very short time, the function of the layer is impaired since it is varnished. For complete decomposition, these systems still require temperatures of usually more than 380° C.

Finally, NGK Insulators Ltd [JP56095022] should be mentioned, which use manganese oxide, copper oxide and iron oxide as catalysts, and a porous enamel as layer matrix to increase the amount of applied catalyst, as well as the protective rights of Matsushita [JP02069574], Cie Euripeenne pour L'Equ [FR2040822] and Hoover LtD [GB1177434] which all use flouropolymers as carrier layer for the catalysts to minimize the surface energy of the carrier layer and prevent adhesion.

Pyrolytic cleaning is very effective at temperatures above 500° C. but is expensive due to the facts given by process technology. These systems are currently used only for ovens of the top price bracket (maximally 10% of all ovens). The reduction in cost promoted the development of catalytic cleaning. The inner walls of the cooking chamber are thereby lined with a layer which always contains a catalyst. Suitable catalysts are manganese oxide, iron oxide and copper oxide, wherein temperature-resistant polymers, sodium silicate, quartz sand and enamel are used as binder phase of the catalyst or as layer component. The catalysts operate at temperatures of more than 380° C. which requires safety measures producing additional costs. Only a few catalytically active coatings are known whose onset temperature, i.e. start of fat disintegration in the layer is between 250° C. and 350° C. In these cases, large amounts of residues remain in or on the layer during permanent operation of the oven below 350° C. with the consequence that these oven inner coatings varnish very quickly.

Catalysis is subject to thermo-dynamic rules. A catalyst cannot change the thermodynamics of a system but only lower the activation energy, i.e. the tendency to start the reaction. Although combustion of the organic soiling occurs thermodynamically only at a higher temperature, it starts at a lower temperature if initiated by a catalyst. Not all parts of the organic soiling disintegrate at this low temperature, which leaves residues which cause varnishing of the interior of the oven with the consequence that the optic and haptic appearance of the oven interior drastically deteriorates after only a few baking and roasting cycles.

It is the underlying purpose of the invention to develop a coating for the interior of an oven which automatically eliminates the soiling produced through roasting and baking, i.e. through application of a temperature of considerably less than 320° C., wherein the working temperature of the layer is preferably 250° C.

SUMMARY OF THE INVENTION

The object is achieved by a ceramic composition (mass), a mixture of a porous ceramic powder and an inorganic binder system, which comprises at least one porous ceramic powder with a an average particle size distribution of more than 500 μm and an inorganic binder system which contains at least one nano-scale particle.

In this fashion, porous ceramic layers can be produced having high temperature stability and abrasion resistance. These layers contain large pores/pore volumes which are accessible for organic soiling (e.g. fats), and also small pores through the introduced porous ceramic particles, which are not accessible for organic soiling. The porous ceramic layers have a very high suction capacity and transport the organic soiling (e.g. fat and meat juice) initially inside the inventive layer. The soiling is spread, i.e. distributed on a very large surface. At a temperature of 250° C., the soiling is almost completely disintegrated with no catalyst being contained in the layer. Precise matching of the binder system and the fact that at least one nanoparticle is used as binding phase, produces a very large inner surface, preferably larger than 20 $m^2/g$, particularly preferred larger than 70 $m^2/g$ and particularly preferred larger than 120 $m^2/g$ which is loaded with organic soiling. On the other hand, the reaction partner oxygen which is required for combustion, is stored already in the porous ceramic parts, similar to a reservoir and is directly available such that the oxidative combustion of the soiling is initiated early and carried out in quantity already at 250° C.

First-time production of a self-cleaning layer for ovens is achieved, which removes almost in quantity organic soiling at temperatures of considerably less than 380° C., preferably considerably less than 320° C. A new possibility to clean ovens consists in the production of an active ceramic layer without catalyst, which, however, offers the possibility to spread organic soiling on a very large surface (due to the nanoparticles) and provide the reaction partner, required for oxidation, in the form of a reservoir in the layer. Compared to commercially available catalytic cleaning systems, the inventive self-cleaning layer is moreover characterized by a considerably higher efficiency at lower temperatures, preferably between 280° C. and 250° C. preventing early varnishing of the coating.

The inventive ceramic layer is characterized by the presence of numerous pores of different sizes and a high inner pore volume. To generate these pores, the inventive composition (mass) preferably contains two different ceramic powder s particles and particularly preferred three different ceramic powder particles. The ceramic particles used are, in particular, chalcogenide, carbide or nitride powders, wherein at least one of these powders is nano-scale. The chalcogenide powders may be oxide powder, sulfide powder, selenide powder or telluride powder, wherein oxide powder is preferred. Any powder which is conventionally used for powder sintering, can be used. Examples are (optionally hydrated) oxides such as $ZnO$, $CeO_2$, $SnO_2$, $Al_2O_3$, $SiO_2$, $TiO_2$, $In_2O_3$, $ZrO_2$, yttrium-stabilized $ZrO_2$, $Fe_2O_3$, $Fe_3O_4$, $Cu_2O$ or $WO_3$ as well as phosphates, silicates, zirconates, aluminates and stannates, carbides such as WC, $CdC_2$ or SiC, nitrides such as BN, AlN, $Si_3N_4$, and $Ti_3N_4$ corresponding mixed oxides such as metal-tin-oxides, e.g. indium-tin-oxide (ITO). Moreover, also mixtures of the stated powder parts can be used.

The inventive composition (mass) contains a ceramic powder which is characterized by a high specific, largely inner surface, larger than 50 $m^2/g$, preferably larger than 100 $m^2/g$, and particularly preferred larger than 150 $m^2/g$. This porous ceramic powder has aan average particle size distribution with an average particle size of more than 500 nm, preferably larger than 1 μm and particularly preferred larger than 30 μm. This ceramic powder is an oxide, hydroxide, chalcogenide, nitride or carbide of Si, Al, B, Zn, Zr, Cd, Ti, Ce, Sn, In, La, Fe, Cu, Ta, Nb, V, Mo or W, particularly preferred of Si, Zr, Al, Fe and Ti. The use of oxides is particularly preferred. Preferred inorganic solid particles are aluminum oxide, boehmite, zircon oxide, iron oxide, silicone dioxide, titanium dioxide, silicates, stone powder, perlites and zeolites or mixtures of these inorganic solids.

The inventive composition moreover contains an inorganic binder system, which consists of a solvent and at least one nano-scale powder. The primary parts of the nano-scale powder may be present in an agglomerated form, preferably in a non-agglomerated or substantially non-agglomerated form. Any conventional solvent can be used preferably 2-butoxy ethanol, ethanol, 1-propanol, 2-propanol, particularly preferred water. The ceramic powder is an oxide, hydroxide, chalcogenide, nitride or carbide of Si, Al, B, Zn, Zr, Cd, Ti, Ce, Sn, In, La, Fe, Cu, Ta, Nb, V, Mo or W, particularly preferred of Si, Zr, Al, Fe, and Ti. The use of oxides is particularly preferred. Preferred inorganic nano-scale solid particles are aluminum oxide, boehmite, zircon oxide, iron oxide, silicon dioxide, titanium dioxide, and goethite or mixtures of these inorganic nano-scale solids. To adjust the viscosity of the inorganic binder system, all conventional inorganic and organic acids and lyes can be used, preferably hydrochloric acid, phosphoric acid and nitric acid.

A third ceramic powder may be added to the inventive composition, optionally for precise adjustment of the porosity. This powder consists of ceramic particles of an average particle size distribution of between 10 nm and 1 μm, preferably between 150 nm and 600 nm. The substance of the third ceramic powder is oxide, hydroxide, chalcogenide, nitride or carbide of Si, Al, B, Zn, Zr, Cd, Ti, Ce, Sn, In, La, Fe, Cu, Ta, Nb, V, Mo or W, particularly preferred of Si, Zr, Al, Fe and Ti. The use of oxides is particularly preferred. Preferred inorganic solid particles are aluminum oxide, boehmite, zircon oxide, iron oxide, silicon dioxide, titanium dioxide, silicates, and stone powder.

The inventive composition can optionally be extended through adding one or more coloring inorganic components. Any conventional inorganic colorants can be used as coloring component, preferably spinels. The combination of several coloring components permits arbitrary adjustment of color effects (patterns and spots) in addition to pure colors.

The third optionally used ceramic powder is mixed with the likewise optionally used coloring powders and slurried with the solvent. The porous ceramic powder and the inorganic binder system are added to this slurry, thereby producing a ceramic suspension which can be applied, dried and subsequently compacted into a porous ceramic layer through spin coating, dip coating, immersion, flooding or preferably spraying onto a desired substrate. For compacting, temperatures of up to 1200° C. can be used, preferably between 400° C. and 1000° C. and particularly preferred between 700° C. and 850° C.

The inventive ceramic composition permits application of porous, ceramic layers onto metal, glass, enamel or ceramic surfaces having layer thicknesses of between 20 μm and 1 mm, preferably between 70 μm and 600 μm.

In a particular embodiment of the invention, these porous, ceramic layers can be covered with catalysts to permit utilization of these layers for catalytic reactions, e.g. in the chemical industry.

The following example explains the invention without limiting it:

EXAMPLE 1

15.0 g of MARTOXID® (company Martinswerk) aluminum oxide powder is mixed with 10.0 g of spinel pigment PK 3060 (company Ferro) and slurried with 52.0 g water. 70.0 g of a porous aluminum oxide (NABALOX® NG100, company Nabaltec) is added thereby obtaining a highly viscous pasty slurry. Addition of 3.8 g of a 65% nitric acid greatly reduces the viscosity producing a stirrable suspension. 26.38 g of an inorganic binder solution (40% nano-scale zircon oxide/60% water) is added to this suspension. The viscosity of the now sprayable suspension can be arbitrarily adjusted by small amounts of water and/or nitric acid.

The invention concerns a method for producing a highly porous, ceramic layer and for applying this layer onto metallic, ceramic, enameled and/or glass substrates using porous ceramic particles, preferably aluminum oxide, titanium oxide and zircon oxide and an inorganic binder system. The inorganic binder system contains at least one ceramic nano particle of a particle size of less than 100 nm, preferably less than 50 nm and particularly preferred less than 25 nm. The solvent is water. Layers produced in this fashion are suited as self-cleaning active layers, e.g. in ovens, in combustion engines etc. or generally for coating substrates to drastically increase their specific surface, e.g. for catalyst substrates.

We claim:

1. A method for producing a composition for a highly porous ceramic layer, said method comprising:
   providing a porous ceramic powder having an inner surface larger than 50 m$^2$/g and an average particle size distribution of more than 500 nm;
   providing an inorganic binder system containing at least one nano-scale powder and a solvent; and
   mixing the porous ceramic powder and the inorganic binder system to form the composition.

2. The method according to claim 1 wherein said solvent comprises water.

3. The method according to claim 1 wherein the porous ceramic powder inner surface is larger than 100 m$^2$/g and the average particle size distribution is more than 1 μm.

4. The method according to claim 1 wherein the porous ceramic powder inner surface is larger than 150 m$^2$/g and the average particle size distribution is more than 30 μm.

5. The method according to claim 1 wherein the porous ceramic powder is selected from a group consisting of aluminum oxide, boehmite, zircon oxide, iron oxide, silicon dioxide, titanium dioxide, silicates, stone powder, perlites, zeolites and mixtures thereof.

6. The method according to claim 1 wherein said nano-scale powder is selected from a group consisting of $Al_2O_3$, AlO(OH), $ZrO_2$, $TiO_2$, $SiO_2$, $Fe_3O_4$, $SnO_2$ and mixtures thereof and wherein an average primary particle size of the nano-scale powder is below 100 nm and the solvent comprises water or an alcohol selected from a group consisting of 2-butoxy ethanol, ethanol, and 1-propanol and 2-propanol.

7. The method according to claim 1 further comprising providing another ceramic powder, and wherein the another ceramic powder is present in an amount providing adjustment of composition porosity, said another ceramic powder having an average particle size distribution of between about 10 nm and 1 μm and said anotherceramic powder is selected from a group consisting of aluminum oxide, boehmite, zircon oxide, iron oxide, silicon dioxide, titanium dioxide, silicates and stone powder.

8. The method according to claim 1 wherein one or more inorganic colorants are added to the composition.

9. The method according to claim 1 further comprising providing a plurality of inorganic colorants in amounts enabling adjustment of a color of the composition.

10. The method according to claim 1 further comprising applying, the composition onto a ceramic, metallic, enameled or glass substrate through a step selected from a group consisting of spin coating, dip coating, immersion, flooding and spraying and further comprising drying and condensing the composition.

11. The method according to claim 10 wherein the composition is condensed at a temperature of up to 1200° C.

12. A porous ceramic layer produced in accordance with the method of one of the claims 1-5, claim 6, claim 7 and claims 8-11.

13. The method according to claim 10 further comprising applying the composition to an oven surface to act as a self-cleaning layer.

* * * * *